United States Patent
Kobayashi et al.

(10) Patent No.: US 8,870,694 B2
(45) Date of Patent: *Oct. 28, 2014

(54) TENSIONER

(75) Inventors: Takao Kobayashi, Nagano (JP); Tanehira Amano, Nagano (JP); Ikuomi Takahashi, Nagano (JP); Takahiro Ito, Nagano (JP)

(73) Assignee: NHK Spring Co., Ltd., Nagano (JP)

( * ) Notice: Subject to any disclaimer, the term of this patent is extended or adjusted under 35 U.S.C. 154(b) by 437 days.

This patent is subject to a terminal disclaimer.

(21) Appl. No.: 13/121,260

(22) PCT Filed: Sep. 17, 2009

(86) PCT No.: PCT/JP2009/066212
§ 371 (c)(1),
(2), (4) Date: Jun. 10, 2011

(87) PCT Pub. No.: WO2010/038619
PCT Pub. Date: Apr. 8, 2010

(65) Prior Publication Data
US 2011/0237372 A1  Sep. 29, 2011

(30) Foreign Application Priority Data
Oct. 1, 2008  (JP) .................................. 2008-255893

(51) Int. Cl.
*F16H 7/08* (2006.01)

(52) U.S. Cl.
CPC ...... *F16H 7/0848* (2013.01); *F16H 2007/0806* (2013.01); *F16H 2007/0853* (2013.01)
USPC .......................................... 474/111; 474/110

(58) Field of Classification Search
USPC .................................................. 474/111, 110
See application file for complete search history.

(56) References Cited

U.S. PATENT DOCUMENTS

| | | | | |
|---|---|---|---|---|
| 5,304,099 | A * | 4/1994 | Deppe et al. ................... | 474/110 |
| 6,612,408 | B2 * | 9/2003 | Serkh et al. ..................... | 188/129 |
| 6,808,466 | B2 * | 10/2004 | Yoshida et al. ................ | 474/110 |
| 6,994,644 | B2 * | 2/2006 | Yoshida et al. ................ | 474/110 |
| 7,331,891 | B2 * | 2/2008 | Poiret ............................ | 474/110 |

(Continued)

FOREIGN PATENT DOCUMENTS

| | | |
|---|---|---|
| EP | 0 869 298 | 10/1998 |
| JP | 2002 139110 | 5/2002 |

(Continued)

*Primary Examiner* — William E Dondero
*Assistant Examiner* — Minh Truong
(74) *Attorney, Agent, or Firm* — Greer, Burns & Crain, Ltd.

(57) ABSTRACT

A tensioner has a cylindrical member having multiple locking teeth, one or multiple locking pieces having locking teeth to be engaged with the locking teeth, and a locking piece receiving part to receive the aforementioned locking pieces. A shaft member is disposed inside the cylindrical member, and either the cylindrical member or the shaft member constitutes a thrust member that can be driven forward and backward by a biasing force. A ratchet mechanism allows the thrust member to move forward by the locking pieces riding over the locking teeth of the cylindrical member as they move in a reduced-diameter direction and constrains retraction of the thrust member by the locking pieces engaging with the locking teeth of the cylindrical member as they move in an increased-diameter direction. The locking teeth are all thread-like teeth having a lead angle.

4 Claims, 10 Drawing Sheets

(56) References Cited

U.S. PATENT DOCUMENTS

| | | |
|---|---|---|
| 8,267,819 B2 * | 9/2012 | Lehtovaara et al. ......... 474/109 |
| 8,529,388 B2 * | 9/2013 | He ............................... 474/111 |
| 2003/0166428 A1 * | 9/2003 | Beardmore .................. 474/110 |
| 2003/0236144 A1 * | 12/2003 | Seungpyo .................... 474/110 |
| 2006/0035740 A1 * | 2/2006 | Lehtovaara et al. ......... 474/237 |
| 2007/0054767 A1 * | 3/2007 | Yamada ........................ 474/109 |
| 2009/0176609 A1 * | 7/2009 | Lehtovaara et al. ......... 474/112 |
| 2011/0251001 A1 * | 10/2011 | Kobayashi et al. ........... 474/110 |

FOREIGN PATENT DOCUMENTS

| | | |
|---|---|---|
| JP | 2007-092831 | 4/2007 |
| JP | 2007-100753 | 4/2007 |
| SU | 55-147309 | 10/1980 |
| SU | 61-69556 | 5/1986 |

* cited by examiner

TENSIONER

FIELD OF THE INVENTION

The present invention relates to a tensioner, which keeps constant the tension of an endless belt or endless chain.

BACKGROUND OF THE INVENTION

A tensioner presses, with a specified force, a timing chain or a timing belt that is used for example, for an automobile engine. The tensioner functions to keep the tension of the chain or belt constant and thereby to prevent the chain or belt from becoming elongated or slack.

FIG. 7 shows the condition when a tensioner 100 is mounted to an engine body 200 of an automobile. A pair of cam sprockets 210, 210 and a crank sprocket 220 are arranged inside the engine body 200, and a timing chain 230 is hooked across these sprockets 210 and 220 in an endless manner. A chain guide 240 is swingably arranged along a portion of the movement path of the timing chain 230, and the timing chain 230 slides on the chain guide 240. A mounting surface 250 is formed on the engine body 200, and the tensioner 100 is inserted through the mounting hole 260 and is fixed on the mounting surface 250 by bolts 270. Also, lubricating oil (not shown) is filled inside the engine body 200.

A prior-art tensioner includes (1) a columnar moving member that is movable toward a moving chain, (2) a case that includes a slide hole through which the moving member is inserted so as to move freely and be concentrically arranged with the moving member, (3) a propelling spring that presses the moving member against the case, (4) a holder member that is fitted with the moving member in the concave part that is coaxially formed on the case's tip opening side of the slide hole, displaced in the axial direction of the drive member, and provided concentrically with the concave part, (5) a holder spring that presses the holder member in the moving member's moving direction, (6) multiple locking pieces that slide on an inclined cam and are meshed with multiple locking teeth formed on the outside of the drive member, (7) a cam-introducing ring that is fitted with the drive member in the slide hole and restrains the multiple locking pieces from becoming unengaged from the multiple locking teeth, and (8) an enclosing plate that inserts the drive member, in such a way that the drive member can move forward or backward, and movably encloses the holder spring, the holder member, the locking pieces, and the cam-introducing ring—all of which are sequentially arranged in the concave part of the slide hole. In this tensioner, when the chain extends during the operation of the engine, the drive member sequentially moves forward one tooth at a time, thereby maintaining proper chain tension (for example, see Patent Document 1).

In the above-mentioned tensioner, the drive member is pressed forward by the propelling spring, and the diameter of the locking pieces is enlarged. The locking pieces can move forward while climbing over the locking teeth of the drive member. Also, the locking pieces can be pressed backwards toward the cam inclined face, which reduces the diameter of the locking pieces. The locking pieces are then meshed with the locking teeth of the drive member, restrained from moving backward, and locked.

When mounted to an engine body, the moving member moves forward to a position where a proper chain tension can be maintained, and is prevented from being returned excessively from that forward position while receiving vibrations from the chain guide. If an excessive load is applied, the holder member moves backward, and the holder spring is flexed so as to keep proper chain tension. Also, if the chain is elongated due to use over a long period of time, the moving member moves forward appropriately as the chain guide moves forward, so that proper chain tension can be maintained.

FIG. 8(a) is a vertical cross-sectional view of a prior-art tensioner that has the same structure as the tensioner of the above-mentioned Patent Document 1. FIG. 8(b) is a side view of FIG. 8(a). FIG. 9(a) shows how the moving member of the tensioner in FIG. 8 completely engages with the locking pieces. FIG. 9(b) is a cross-sectional view along line D-D of FIG. 9(a), FIG. 10 (a) is a drawing that shows an enlarged view of the locking pieces shown in FIG. 9 when the moving member advances. FIG. 10 (b) is a cross-sectional view along line E-E of FIG. 10 (a). In these figures, the reference character 310 represents the moving member, 320 represents locking pieces, 330 represents the holder member, 340 represents the propelling spring, 350 represents the pressing spring that presses the locking pieces 320 to the inclined cam face 330a of the holder member 330 and biases the locking pieces in the diameter-reduced direction so that the locking pieces become engaged with the moving member 310, 360 represents the holder spring, and 370 represents the case.

DISCLOSURE OF THE INVENTION

Problems to be Solved by the Invention

In the prior-art tensioner, members are disposed sequentially from the axis in a concentric pattern in the following order: moving member 310, locking pieces 320, holder member 330, and case 370. Because the outside diameter of the case 370 is generally determined in accordance with the diameter of the mounting hole 260 of the engine body 200, the way that the members are arranged tends to cause the diameter of the locking teeth 310b of the moving member 310 to be small. In a high-powered engine and the like, vibrations from the cam chain are high, and accordingly the locking areas of the moving member 310 and locking pieces 320 must be increased in order to endure the resulting overloading, so that the outside diameter of the moving member 310 must be proportionally increased. However, if the outside diameter of the moving member 310 is increased, the outside diameter of the case 370 becomes larger, even to the size such that the moving member 310 cannot be inserted into the predetermined mounting hole 260. This causes the problem of limiting design freedom.

When the moving member 310 moves, the locking pieces 320 climb over the nearest subsequent locking tooth and then engage with the next locking tooth, and the locking pieces are enlarged along the inclined cam face 330a of the holder member 330 in the outward direction. When the height of a tooth of the locking teeth is h, and the amount to be enlarged to climb over the height h is c, the holder member 330 requires an inside space C that is slightly larger than c (FIGS. 9, 10), so that the locking pieces are able to climb over one tooth without fail even if the precision of the components of the tensioner varies, and accordingly the outside diameter of the case 370 becomes larger for that reason. If the locking pieces 320 are disposed opposite with each other so as to form a pair of pieces, 2 Cs are required.

Also, the locking pieces 320 are designed so as not to move backwards, and therefore they cannot be expected to make return movements. Due to the heat-caused expansion of the engine body (block) 200 as the temperature inside the engine rises, the distance between the crankshaft and the cam shaft over which the timing chain 230 is placed varies (FIG. 7), and the timing chain slackens at low temperature and tightens at high temperature. When the temperature is low, because of the slackness of the timing chain 230, if the moving member 310 is in the position where locking pieces 320 climb over a locking tooth and nearly engage with the next locking tooth, the mechanical contact causes a rattling sound due to backlash. In contrast, when the temperature is high, the timing chain 230 tightens and pushes the moving member 310 backwards. At that time, the locking pieces 320 completely engage with the moving member 310, and even if the moving member 310 is pushed by the timing chain 230, the moving member 310 cannot move backward, and there results excessive tension on the timing chain 230, which becomes subject to overload. Under these circumstances, the contact sound is decreased by reducing the pitch of the locking teeth, and overload resistance is achieved by allowing the holder spring 360 that is mounted at the rear of the holder member 330 to contract. However, if the pitch of the locking teeth is too low, the height of the tooth of the locking teeth h becomes low, and therefore design freedom is limited due to the reduced strength of the locking teeth and the like.

The purpose of this invention is to provide a tensioner having features such that the structure is simplified, the strength of locking teeth is increased and the backlash thereof is decreased, the number of parts and the cost can be reduced, and the design freedom is large.

Means for Solving the Problems

In order to achieve the above purpose, the tensioner includes (1) a tubular member on which multiple locking teeth are formed, (2) one or more locking pieces that engage with the locking teeth, and (3) a locking-piece receiving part that receives the locking pieces. In the tubular member is a shaft member or shaft, and the tubular member and the shaft separately operate as moving members that move in a manner reciprocal to each other due to a biasing force. The locking pieces move in the diameter-reduced direction so as to climb over the locking teeth of the tubular member, so that the moving member is capable of advancing. Also provided is a ratchet mechanism that restrains the backward movement of the moving member that results because the locking pieces move in the diameter-enlarged direction so as to engage with the locking teeth of the tubular member. The locking teeth are screw teeth of which an one tooth has a lead, and the dimensions of the parts and the other specifications are set so as to satisfy the relationship of Formula 3.

$$R1 \cdot \tan \rho1 + R2 \cdot \tan(\rho2 - \theta) < 0 \quad \text{Formula 3}$$

where $R1=d1e/2$, $d1e$=effective contact diameter of the locking-piece receiving part, $R2=d2e/2$, $d2e$=the effective diameter in contact of locking teeth of locking pieces, $\rho1 = \tan^{-1} \mu1$ (friction angle), $\mu1$=apparent coefficient of friction of locking pieces and locking-piece receiving part, $\rho2 = \tan^{-1} \mu2$ (friction angle), $\mu2$=apparent coefficient of friction of the locking teeth of the tubular member and the locking pieces.

The prior-art tensioner requires two movement spaces as 2 Cs towards its outside (FIGS. 9, 10), with the spaces being required when a moving member moves so that a pair of locking pieces climb over locking teeth. However, the present invention does not require a space C to be provided towards the outside, because the locking pieces move in the diameter-reduced direction and climb over the locking teeth. Moreover, because this embodiment does not need a holder member 330 [FIG. 8(a)] as is required in the prior-art tensioner, if the outside diameter of the case body is identical with the outside diameter of the case body of the prior-art tensioner, the diameter of the tubular member can be increased to the diameter of the prior-art tensioner. If the diameter of the tubular member is increased, the rigidity of the tubular member against a load in the lateral direction is increased. Also, if the outside diameter of the tubular member is identical with the outside diameter of the case body of the prior-art tensioner, the locking pieces and the locking teeth inside the tubular member can be strong enough to endure large loads. In contrast, if the inside diameter of the tubular member is identical with the outside diameter of the moving member of the prior-art tensioner, the entire tensioner can be structured so as to be slimmer and more compact, even though the strengths of the locking pieces and locking teeth inside the tubular member are the same.

Also, the locking pieces and the locking teeth of the tubular member, which engage with the locking pieces, have screw teeth each tooth of which has a lead, and if both sides of Formula 3 are multiplied by a dynamic load Wc, the braking torque generated at the effective contact radius R1 of the locking-piece receiving part is smaller than $-Wc \cdot R2 \cdot \tan(\rho2-\theta) = -Tn = Wc$, where $Wc \cdot R1 \cdot \tan \rho1 = Tm = Wc$, and the braking torque becomes the rotating torque generated at the effective contact radius R2. And because Tn is a negative rotating torque, the locking pieces that receive the dynamic load Wc rotate. If, for example, at that time the tubular member operates as a moving member that moves back and forth, the tubular member can move backwards; that is, it can make a return movement because the rotational movement of the tubular member, which engages with the locking teeth of the locking pieces when the locking pieces rotate, is restrained. Accordingly, even if the engine temperature becomes high and the cam chain stretches, overloading is prevented due to the setting that satisfies the relationship of Formula 3, which enables elimination of the holder member 330 and the holder spring 360 [See FIG. 8(a)] that are required by the prior-art tensioner for overload protection.

Furthermore, in the prior-art tensioner, if the engine is cold and the cam chain goes slack, the engagement between the locking pieces 320 and the shaft 310 becomes incomplete, and contact sounds due to backlash might occur. However, in this invention, due to the small back-and-forth movement of the moving member, alternate loads act on the locking pieces, and the locking pieces move in the direction that decreases the backlash of the locking teeth while rotating in the moving-member moving direction. This can decrease the backlash of the locking teeth without making the height of the locking teeth extremely small.

The tensioner is characterized such that (1) the ratchet mechanism is formed on the locking-piece receiving part, (2) the tensioner includes (a) an inclined cam face formed so as to be enlarged in the direction in which the locking pieces engage with the locking teeth of the tubular member, and (b) a pressing spring that presses the locking pieces towards the inclined cam face of the shaft and biases the locking pieces in the diameter-enlarged direction.

In the invention, due to the ratchet mechanism being simply structured due to the inclined cam face and the pressing spring, the locking pieces are enlarged so as both to engage with the locking teeth of the tubular member and to restrain the backward movement of the moving member. Also, the pressing spring presses the locking pieces towards the inclined cam face of the shaft, and biases the locking pieces in the diameter-enlarged direction, which allows the locking pieces and the tubular member to become engaged without rattling.

The invention of is a tensioner and is characterized such that either or both of the tubular member or the shaft is/are restrained to operate in the rotational direction, under which condition the tensioner's locking pieces are engaged with the tubular member in a relatively rotatable manner.

In the invention, locking pieces that receive a dynamic load We from an engine rotate under the condition that the dimensions of each member are set so as to satisfy the conditions of Formula 3 below, so that either or both of the tubular member and the shaft is/are restrained so as to operate in the rotational direction, and whereby either the tubular member or the shaft that operates as a moving member can move backwards.

The invention is a tensioner and is characterized such that the tubular member is restrained to operate in the rotational direction, and the locking pieces and the shaft are engaged so as to be synchronously rotatable.

In the invention, because the locking pieces and the shaft are engaged so as to be synchronously rotatable, the contact angle γ between the supporting surface by which the shaft is supported in the axial direction and the plane at a right angle to the axis can be small (where tan ρ1=μ/cos γ; μ=the real coefficient of friction of the thread face of the locking teeth, the locking-piece receiving part, and the axial-direction support portion by which the shaft is supported in the axial direction), whereby the braking torque Tm=Wc·R1·tan $\rho_1$ due to the friction between the locking pieces and the shaft can be made smaller, which ensures that either the tubular member or the shaft can move backwards.

The invention is the tensioner and is characterized such that the contact angle γ between the supporting surface by which the locking-piece receiving part or the shaft is supported in the axial direction and the plane at a right angle to the axis is set as γ≈0°.

In the invention, because the contact angle γ between the supporting surface by which the locking-piece receiving part or the shaft is supported in the axial direction and the plane at a right angle to the axis is set as γ≈0° (approximately equal to zero degrees), the braking torque Tm due to the friction between the locking pieces and the shaft is made smaller, so that the reliability for easily moving backwards either the tubular member or the shaft that operates as a moving member can be increased.

Effects of the Invention

According to the present invention, the locking pieces and the shaft are accommodated inside the tubular member, and the shaft, the locking pieces, and the tubular member are disposed in that order from the tensioner's axis towards the outside. And because the locking pieces move in the diameter-reduced direction so as to climb over the locking teeth, a space C need not be provided towards the outside, and also a holder member need not be provided. Accordingly, the diameter of the tubular member can be set appropriately. Therefore, if the outside diameter of the tubular member is identical with that of the case body, when the diameter of the tubular member is increased, the tubular member's rigidity against the load in the lateral direction can be increased, and also the tubular member's diameter can be set to allow the locking pieces and the locking teeth inside the tubular member to have the strength to endures large loads. Or, if the inside diameter of the tubular member is set so as to be identical with the outside diameter of the moving member of the prior-art tensioner so that the strength of the locking pieces is identical with that of the locking teeth of the tubular member, the entire tensioner can be slimmer and more compact. Also, the locking pieces and the locking teeth of the tubular member which engage with the locking pieces have screw teeth, each of which has a lead, the locking pieces that receive the dynamic load We from an engine rotate, which (1) enables either the tubular member or the shaft that operates as a moving member to move backwards, (2) prevents overloading, and (3) eliminates the need for such members as a holder member or a holder spring, which are required in the prior-art tensioner. Furthermore, due to the small back-and-forth movement of the moving member, alternate loads act on the locking pieces, and the locking pieces move in the direction that decreases the backlash of the locking teeth while rotating in the moving member advancing direction, and therefore this can decrease the backlash of the locking teeth without making the height of a tooth of the locking teeth extremely small.

Accordingly, this invention can provide a tensioner having features such that the structure is simplified, the strength of locking teeth is increased and the backlash thereof is decreased, the number of parts and cost can be reduced, and large design freedom is attained.

BEST MODES FOR CARRYING OUT THE INVENTION

Detailed explanations for implementing the present invention's tensioner follow below, with reference to the drawings of the embodiments.

Embodiment 1

FIG. 1(a) is a vertical sectional view that shows the first embodiment of the present invention; FIG. 1(b) is a right-side view of FIG. 1(a); FIG. 1(c) is a cross-sectional view along line A-A of FIG. 1(a); and FIG. 2 is an exploded perspective view of a principal part of the tip-end section (ratchet mechanism) of the tensioner of Embodiment 1.

The tensioner in the first embodiment generally consists of: (1) a tubular member 1 that is a moving member on which multiple locking teeth 1b are formed in a hollow; (2) multiple, separated, nut-shaped locking pieces 2 (four pieces are shown in FIGS. 1 and 2) that become engaged with locking teeth 1b on the inside surface of the tubular member 1; (3) a shaft 3 that is movably fit inside the interior of the tubular member 1, and that has a locking-piece receiving part that receives the locking pieces 2 on the outer side of the top part of the shaft 3; (4) a propelling spring 4 that biases the tubular member 1 in the moving direction; (5) a pressing spring 5 that biases the locking pieces 2 in the direction towards the receiver of the locking pieces of the shaft 3; (6) a hollow case having a bottom 7 that fitly accommodates the tubular member 1 so that the tubular member 1 can move back and forth; and (7) a bearing 10 that is mounted on the top of the case 7.

The case 7 is formed in the shape of a tube having a bottom provided with a flange 7b at the rear end (the end opposite to the top part of the shaft 3) of the body 7a. The body 7 includes a receiving hole 7c that extends towards its top part in the axial (moving) direction. The top part of the receiving hole 7c is open, and the assembly of the tubular member 1, locking pieces 2, shaft 3, propelling spring 4, and pressing spring 5 is accommodated inside the receiving hole 7c. An internal thread hole 7f is provided at the center of rear-end bottom 7e of the case 7.

The flange 7b of the case 7 is used to mount the tensioner on an engine body 200, and the tensioner is mounted on the engine body 200 by two bolt members in such a manner that the undersurface of the flange 7b shown in FIG. 1 is in contact with the locating plane (not shown) provided on the inside wall (not shown) of the engine body 200.

In the tubular member 1, the rear-end portions 1c are open, a closing wall 1a is provided at its top, and locking teeth 1b that engage with the four locking pieces 2 are formed inside. The tensioner is mounted on the engine body 200 in such a manner that the top surface of the closing wall 1a of this tubular member 1 is in contact with a belt or a chain guide 240 (see FIG. 7).

The propelling spring 4, which is a compression spring, is disposed along the inner surface of the receiving hole 7c of the case 7, between the surfaces of the rear-end portions 1c and the internal surface of the receiving hole 7 of case 7 in such a manner that the propelling spring is penetrated by the shaft 3. The tubular member 1 is biased by the propelling spring 4 so as to be moved in the axis direction so that the tubular member protrudes from the case 7.

In this embodiment, the holder member 330 and holder spring 360 for overload protection used in the prior-art tensioner [shown in FIG. 8(a)] are eliminated. The overload protection function that is to operate when an engine overload occurs is explained below.

A bearing 10 is formed in the shape of a cap made of a flat portion having a predetermined thickness, is mounted and fastened from the outside so as to be fixed on the top of the case 2. The bearing 10 has a slide hole 10a on which a pair of protruding portions 10b are formed and through which the tubular member 1 penetrates so as to enter the slide hole 10a. A pair of grooves 1d are formed on the outer surface of the first half of the front-end section of the tubular member 1, and the pair of protruding portions 10b are positioned so as to correspond to the inside of the pair of the grooves 1d so that the pair of protruding portions 10b are slidably fit inside the pair of grooves 1d, whereby the tubular member 1 can move in the axis direction in such a manner that the rotation of the tubular member is restrained.

As shown in FIG. 1, in the shaft 3 an external thread 3b that is formed on the rear end of the shaft 3 is screwed so as to be fixed to the internal thread hole 7f of the rear-end bottom 7e of the case 7. An umbrella-shaped, stepped end face 3d, whose diameter is larger than that of the axial body 3a, is formed at the apical part of the shaft 3, and the inclined cam face 3c, whose diameter is gradually reduced in the moving direction, is formed on the outside of the apical part of the shaft 3, and a small-diameter axial region 3e on which the groove 3i is provided is continuously formed at the apical part periphery of the inclined cam face 3c. The inclined cam face 3c operates as a locking-piece receiving part that receives four separated nut-shaped locking pieces 2 that are described below. At that time, the outside diameter of umbrella-shaped, stepped end face 3d of shaft 3 is set to be slightly smaller than the inside diameter of locking teeth 1b inside the tubular member 1.

As shown in FIGS. 1 and 2, the locking pieces 2 have parallel cut faces 2d that are formed by cutting a tube-shaped nut so that locking teeth 2a are formed on its outside, in the axial direction. At the inner circumference of the rearward portion (in the direction of the backwards movement) of the locking pieces 2 there is formed an inclined cam face 2b that has a partially conical surface, with the diameter of the cam face being gradually reduced in the moving direction. At the tip end of the inclined cam face 2b, a small-diameter stepped portion 2c that has a partially tubular surface is continuously formed. The inclined cam face 2b is shaped so as to slidably contact the inclined cam face 3c of the shaft 3. In this embodiment, four locking pieces 2 are radially positioned and equally spaced such that two pairs of those pieces are disposed opposite to each other in relation to the center axis. The number of such locking pieces 2 is not limited to four, but can be appropriately increased or decreased according to the input load from the engine.

In this embodiment, a holding plate 9 is fit onto the small-diameter axial region 3e of the shaft 3, and the C-ring 10 that engages with the inside of the groove 3i of the small-diameter axial region 3e prevents the holding plate 9 from falling from the end of the small-diameter axial region 3e.

Also, a pressing spring 5, which is a compression spring, is disposed between the holding plate 9 and a washer 8 that is fit onto small-diameter stepped portion 2c of the locking pieces 2, which are always biased by the pressing spring 5 in the diameter-enlarged direction, towards the inclined cam face 3c of the shaft 3. This secures engagement that decreases the backlash between the locking pieces 2 and the locking teeth 2a and 1b (of the tubular member 1) that causes rattling. When a washer 8 is provided between the pressing spring 5 and the locking pieces 2, whereby rotation of locking pieces 2 is not restricted, the locking pieces 2 can revolve around the inclined cam face 3c of the shaft 3.

The locking teeth 2a and 1b of the locking pieces 2 and the tubular member of this embodiment are made of single-threaded or multi-threaded screw teeth, each of which has a lead angle θ at a right angle to the axial direction.

By securing the predetermined strength of the locking teeth 2a and 1b, a single-threaded screw whose pitch is finely set is capable of preventing rattling of the locking teeth 2a and 1b, and a multi-threaded screw whose pitch is finely set is even more capable of preventing such rattling. The reasons why screw teeth are used for the locking teeth 2a and 1b are revealed by the benefits mentioned below, in addition to the above mentioned advantages.

In this embodiment, locking pieces 2, shaft 3, pressing spring 5, washer 8, and holding plate 9 are accommodated in the tubular member 1, and the shaft 3, locking pieces 2, and tubular member 1 are disposed from the axis to the outside in that order, and while the locking pieces 2 and the tubular member 1 are engaged they are accommodated in the receiving hole 7c of the case 7.

In the first embodiment of the tensioner, the tubular member 1 advances such that the locking pieces 2 move in the diameter-reduced direction, and then the locking teeth 2a climb over the locking teeth 1b inside the tubular member 1, whereby the tubular member 1 is able to move, while in the tubular member 1 backwards-moving direction, there is provided a ratchet mechanism that is capable of restraining the backwards movement of the locking pieces 2 due to the engagement of the locking pieces 2 and the locking teeth 2a and 1b of the tubular member 1.

The ratchet mechanism is provided with (1) the inclined cam faces 3c of the shaft 3 and 2b of the locking pieces 2, both of which enlarge the locking pieces 2 in the direction in which the locking pieces 2 become engaged with the locking teeth 1b inside the tubular member 1, and (2) the pressing spring 5 that presses locking pieces 2 toward the inclined cam face 3c of the shaft 3 and biases the same in the locking pieces' diameter-enlarged direction. The tubular member 1 advances such that the locking pieces 2 move along the inclined cam face 3c in the diameter-reduced direction against the force that presses the inclined cam face 3c, and the locking teeth 2a climb over the locking teeth 1b inside the tubular member 1. When the tubular member 1 moves backwards, the backwards movement can be restrained in such a manner that locking pieces 2 are pressed by the inclined cam face 3c of the shaft 3 and are enlarged, and the locking teeth 2a of the locking pieces 2 become engaged with the locking teeth 1b inside the tubular member 1.

In this first embodiment, the locking pieces 2 and shaft 3 are accommodated inside the tubular member 1, and the shaft 3, four locking pieces 2, and tubular member 1 are disposed in that order from the axis towards the outside. Although when the tubular member 1 advances and the locking pieces 2 climb over the locking teeth 1*b* inside the tubular member 1, the prior-art tensioner requires two spaces, i.e., 2 Cs, toward the outside, this embodiment does not need a space C towards the outside, because the locking pieces 2 move in the diameter-reduced direction and climb over the locking teeth 1*b* (see FIGS. 9 and 10). Furthermore, because this embodiment does not need a holder member 330 as is required in the prior-art tensioner, if the outside diameter of the case body 7*a* is identical with the outside diameter d5 of the case body 7*a* of the prior-art tensioner [see FIG. 8(*a*)], the diameter of the tubular member 1 can be increased according to the diameter of the prior-art tensioner.

If the diameter of the tubular member 1 increases, its rigidity against the load in the lateral direction is also increased, and therefore if the outside diameter of the tubular member 1 is identical with the outside diameter d5 of the case body of the prior-art tensioner, the locking pieces 2, and the locking teeth 2*a* and 1*b* inside the tubular member 1 can be strong enough to endure large loads. Or, if the inside diameter d1 of the tubular member 1 is identical with the outside diameter d1 of the moving member of the prior art tensioner, the entire tensioner can be slimmer and more compact even though the strength of the locking teeth 2*a* and 1*b* is unchanged.

Table 1 compares the dimensions of the main parts (unit: mm) between the prior-art tensioner and the present invention. The reference characters are those shown in FIGS. 1 (*a*) and 8 (*a*)

TABLE 1

| Dimensions of Main Parts (reference characters) | Conventional tensioner | Example 1 of Present Invention | (Unit: mm) Example 2 of Present Invention |
|---|---|---|---|
| Height of locking teeth 1b (h) | 0.5 | 0.5 | 0.5 |
| Space (C) | 1 | 1 | 1 |
| Outside diameter or inside diameter of locking teeth 1b (d1) | 8 | 8 | 12 |
| Outside diameter of locking pieces 2 (d2) | 12 | — | — |
| Inside diameter of holder member 3 (d3) | 14 | — | — |
| Outside diameter of holder member 3 (d4) | 16 | — | — |
| Outside diameter of case body 7a (d5) | 20 | 16 | 20 |
| Outside diameter of moving member 1 (d10) | 8 | 12 | 16 |

If the outside diameter d5 of the case body 7 of the prior-art tensioner is 20 mm, the inside diameter d1 of the tubular member 1 of Example 1 of the present invention is identical with the outside diameter d1 of the locking teeth of the moving member of the prior-art tensioner. In this case, although the prior-art tensioner requires an outside diameter d5 of about 20 mm, Example 1 of the present invention requires only 16 mm for the outside diameter. As shown above, the present invention can be made smaller than the prior-art tensioner, and if outside diameter d5 of body 7*a* is identical to that of the prior-art tensioner, the present invention can endure a larger load.

The example of the present invention shows a case in which the outside diameter d5 of body 7*a* is identical to the diameter of the prior-art tensioner. In this case, the outside diameter d1 of the locking teeth 1*b* of tubular member 1 can be as large as 12 mm, compared with the 8 mm of the prior-art tensioner. The reasons for this are stated above.

The tubular member 1 operating as the moving member receives loads from the belt or chain guide 240. The load during engine operation is a dynamic load Wc (alternate load). The reference characters that represent each dimension are explained below.

Wc=dynamic load from engine
d1$e$=effective contact diameter of inclined cam face 2*b* of locking pieces (mm)
R1(=d1$e$/2)=radius of effective contact diameter of inclined cam face 2*b* of locking pieces (mm)
d2$e$=effective contact diameter of locking teeth (screw teeth) 2*a* of locking pieces (mm)
R2 (=d2$e$/2)=radius of effective contact diameter of locking teeth (screw teeth) 2*a* of locking pieces (mm)
γ=angle between the plane at right angle to axis and large-diameter stepped portion 3*d* by which inclined cam faces 3*c* and 2*b* of shaft 3 and locking pieces 2 or shaft 3 are supported (degrees)
θ=screw lead angle of screw face at R2 of locking teeth (screw teeth) 1*b* and 2*a* of tubular member 1 and locking pieces 2 (degrees)
α=flank angle of thread face of locking teeth (screw teeth) 1*b* and 2*a* at axial cross-section (degrees)
μ=real coefficient of friction of locking teeth (screw teeth) 1*b* and 2*a*, thread face, inclined cam faces 3*c* and 2*b*, and large-diameter stepped portion 3*d* (–)
μ1=apparent coefficient of friction of inclined cam faces 3*c* and 2*b*, and large diameter stepped portion 3*d* (–)
μ2=apparent coefficient of friction of thread face of locking teeth (screw teeth) 1*b* and 2*a* (–)
ρ=real friction angle obtained from coefficient of friction (=tan$^{-1}$μ) (degrees)
ρ1=friction angle obtained from coefficient of friction μ1 (=tan$^{-1}$ μ1 degrees)
ρ2=apparent friction angle obtained from coefficient of friction μ2 (=tan$^{-1}$ μ2)
α'=(numerical value during calculation)
Tn=rotating torque generated at R2 of thread face of locking teeth (screw teeth) 2*a* of locking pieces 2 due to Wc (N-mm)
Tm=braking torque generated at R1 of inclined cam face 2*b* of locking pieces 2 due to Wc (N-mm)

If Wc acts on the closing wall 1*a* at the top end of the tubular member 1, the value of μ varies with time due to variations in the dynamic load. Because the locking pieces 2 have locking teeth (screw teeth) 2*a* that have a lead angle θ2, rotating torque Tn due to Wc is generated at the locking pieces, while braking torque Tm due to friction is generated at the inclined cam face 2*b*.

Tn and Tm vary during the operation of the tensioner. When Tn exceeds Tm, the locking pieces 2 make a slight slip rotation at the inclined cam face 3*c* of the shaft 3. Due to this rotation of the locking pieces 2, the tubular member 1, with which the locking teeth 2*a* of the locking pieces 2 engage, moves backwards, in the axial direction due to the load Wc acting backwards because the rotational movement of the tubular member 1 is restrained, and this is so-called return movement. The rotation angle of the locking pieces 2 has a very small range of values, and therefore if the tubular member 1 receives Wc continuously, the tubular member 1 is able to move backwards gradually.

The relationships stated above are expressed by the numerical formulas shown below.

First, with regard to the rotating torque Tn, the relationships are satisfied by the formulas below.

$$Tn = Wc \cdot R2 \cdot \tan(\rho 2 - \theta) \quad \text{[Formula 1]}$$

$$\tan \rho 2 = \mu / \cos \alpha' \quad \text{[Formula 2]}$$

$$\tan \alpha' = \tan \alpha \cdot \cos \theta \quad \text{[Formula 3]}$$

With regard to braking torque Tm, the relationships are satisfied with formulas below.

$$Tm = Wc \cdot R1 \cdot \tan \rho 1 \quad \text{[Formula 4]}$$

$$\tan \rho 1 = \mu / \cos \gamma \quad \text{[Formula 5]}$$

where $\rho 1$ is the inclined cam face 2b of the locking pieces 2, and $\rho 2$ is the apparent friction angle of the thread face of the locking teeth (screw teeth) 2a, respectively.

In general, the inclined cam face 2b of the locking pieces 2 is at an angle $\gamma$ to the right angle to the axis, and therefore the braking torque Tm is increased due to the effect of the wedge shape, compared to the case where the contact with the plane of R1 is made at $\gamma = 0$ (degrees). The same occurs if the thread face of the locking teeth (screw teeth) 2a has a flank angle. In addition, although the real friction angle at the contacting surface is $\rho$, for the purpose of calculation, $\rho 1$ and $\rho 2$ are used.

Also, when $\rho 2$ is smaller than $\theta$, rotating torque Tn occurs at the thread face of the locking teeth (screw teeth) 2a. At this time, Tn takes a negative value, which is a torque that rotates the locking pieces 2.

The backwards movement of the tubular member 1 due to rotations of the locking pieces 2 occurs when Tn exceeds Tm, and such condition is expressed by the following formula:

$$Tm + Tn < 0$$

Substituting Formula 1 and 2 for the above formula gives the following:

$$Wc \cdot R1 \cdot \tan \rho 1 + Wc \cdot R2 \cdot \tan(\rho 2 - \theta) < 0$$

If both sides of the above formula are divided by Wc, the following is obtained:

$$R1 \cdot \tan \rho 1 + R2 \cdot \tan(\rho 2 - \theta) < 0 \quad \text{[Formula 3]}$$

Formula 3 becomes a condition for realizing the return movement of tubular member 1.

FIGS. 4 and 5 compare setting examples 1 and 2 of the return-movement regions for the present invention's tensioner and the prior-art tensioner. In FIGS. 4 and 5, the X axis (axis of abscissas) is the ratio of R1 to R2, and the Y axis (axis of ordinates) is the left-side value of Formula 3.

The setting example 1 of FIG. 4 is a calculation example where $\theta = 10°$, $\gamma = 60°$, $\alpha = 30°$, and R2=5 mm. As stated above, the return-movement region in which the closing wall 1a of the top part of the tubular member 1 receives vibration loads Wc from an engine, and the locking pieces 2 rotate due to the vibration loads Wc, and the moving member 1 makes a return movement, corresponds to when the Y-axis value that is the left-side value of Formula 3 is less than 0.

As stated above, the point of maximum difference between the present invention's tensioner and the prior-art tensioner lies is that the magnitude correlation of the value of the effective contact radius R2=d2e/2 of the locking teeth (screw teeth) 2a of the locking pieces 2 and that of the effective contact radius R1=d1e/2 of the inclined cam face 2b of the locking pieces 2 is reversed, and if the area in which the values of the X axis are less than or equal to 1.0, which are the values the present invention's tensioner shows, and if the area in which the values of the X axis are larger or equal to 1.0, which are the values the prior-art tensioner shows, are compared, most of the values of the Y axis for the present invention's tensioner are less than 0, and therefore FIG. 4 shows that a return movement of the moving member 1 is more likely to occur in the area where the values of X axis are less than or equal to 1.0 and the values of the Y axis are less than 0.

The setting example 2 of FIG. 5 is a calculation example based on the conditions where $\theta = 10°$, $\gamma = 60°$, $\alpha = 30°$, and $\rho 1 = \rho 2 = 3°$, and where the dimensions of the main parts of the prior-art tensioner, Example 1 of the present invention (Embodiment 1) and Example 2 of the present invention (Embodiment 2), are substituted for Formula 3.

The calculation results are shown in Table 2 below.

TABLE 2

| Dimensions of Main Parts; Reference Characters; Calculated Values of the Dimensions | Prior art | Example 1 of the Present Invention | Example 2 of the Present Invention |
|---|---|---|---|
| Effective contact diameter of inclined cam face: d1e (mm) | 10.00 | 7.00 | 5.00 |
| Effective contact diameter of screw teeth: d2e (mm) | 7.50 | 11.00 | 7.50 |
| Effective contact radius of inclined cam face: R1 (mm) | 5.00 | 3.50 | 2.50 |
| Effective contact radius of screw teeth: R2 (mm) | 3.75 | 5.50 | 3.75 |
| Angle of inclined cam face: $\gamma$ (degrees) | 10.00 | 10.00 | 10.00 |
| Lead angle of screw teeth: $\theta$ (degrees) | 60.00 | 60.00 | 60.00 |
| Flank angle of thread face: $\alpha \theta$ (degrees) | 10.00 | 10.00 | 10.00 |
| R1/R2 | 1.33 | 0.64 | 0.67 |
| Tm = Wc · R1 · tan $\rho 1$ | 0.52 | 0.37 | 0.26 |
| Tn = Wc · R2 · tan ($\rho 2 - \theta$) | −0.43 | −0.63 | −0.43 |
| Left-side value of Formula 3 = Tm + Tn | 0.09 | −0.26 | −0.17 |

(Where $\theta = 10°$, $\gamma = 60°$, $\alpha = 30°$, $\rho 1 = \rho 2 = 3°$)

If the left-side values of Formula 3 based on the above calculation example are plotted as shown in FIG. 5, the values of the Y axis of the present invention's tensioner, i.e., the left-side values of Formula 3, are less than those of the prior-art tensioner, which means that the present invention's tensioner is able to make return movements.

As stated above, when designing the present invention's tensioner, the dimensions of the parts and the specifications are appropriately set as described above, so that the value of the Y axis in FIG. 4 is negative, which is the condition where the tubular member 1 is capable of making return movements. The prior-art tensioner cannot make return movements backwards, and therefore, as shown in FIG. 8(*a*), the prior-art tensioner has no other choice but to allow the holder spring 360 that is mounted at the back of the holder member 330 to contract so as to protect against overloading. The present invention's tensioner is improved in that regard, and due to the condition setting that allows the tubular member 1, which is a moving member, to make return movements, the moving member is capable of making return movements without the need for a holder spring.

In addition, there can be selected a condition setting that yields a positive value for the Y axis, by which return movements of the tubular member 1, which is a moving member, are intentionally avoided.

Embodiment 2

FIG. 3(*a*) is a cross-sectional view that shows the second embodiment of the present invention's tensioner, and FIGS. 3(*b*) and 3(*c*) are, respectively, a side view and a view seen from the left side of the anti-rotation plate of the second embodiment.

The second embodiment differs from the first embodiment in regard to the following points: (1) the shape of the shaft 3 and how shaft 3 is attached to the rear end of the case 7 are different; (2) shaft 3 is rotatably attached to the case 7; (3) the anti-rotation plate 8' that restrains the relative rotation of the locking pieces 2 against the inclined cam face 3c of the shaft 3 is provided instead of the washer 8 that is on the small-diameter stepped portion 2c of the locking pieces 2 in the first embodiment; and (4) the pair of locking pieces 2 and the shaft 3 are structured so that they can rotate synchronously. In other respects the structure is the same as that of the first embodiment. The ways that the second embodiment differs from the first embodiment will now be explained.

The case 7 of this embodiment differs from that of the first embodiment in the following ways: (1) the projection portion 7g that extends in the axial direction to the intermediate part of the receiving hole 7c is provided in the center of the rear-end bottom 7e; (2) a guide bore 7h pierces the central portion of the projection portion 7g from the rear-end bottom 7e; and (3) the axial body 3a of the shaft 3 is penetrated through the end wall 7i in which the axial-body bearing hole 7j is open, with the bearing hole rotatably supporting the axial body 3a. In other respects the structure is the same as that of the first embodiment.

The outside diameter of the projection portion of the case 7 is smaller than the inside diameter of the locking teeth 1b inside the tubular member 1.

In the shaft 3, as shown in FIG. 3(a), a slot 3g is provided on the outside of the axial body 3a, and a C-ring 12 on the slot 3g prevents the axial body 3a from falling while the axial body 3a is rotatably penetrated so as to be fitted inside the axial-body bearing hole 7j of the projection portion 7g of the case 7.

The shape of the top part of the shaft 3 is the same as in the first embodiment, except that a parallel cut face 3f is formed in the axial direction on the large-diameter, umbrella-shaped, stepped end face 3d, and the inclined cam face 3c and small-diameter axial region 3c are continuously formed at the top part of the inclined cam face 3c on the shaft 3. The functions of the parallel cut face 3f and the small-diameter axial region 3e will be explained later.

Also, in this embodiment, the holder member 330 and the holder spring 360 of the prior-art tensioner [FIG. 8(a)] are omitted in the same manner as in the first embodiment. The overload protection function that operates when overload from an engine occurs will be explained later.

In this embodiment, locking pieces 2 that have the same shape as in the first embodiment are disposed so that they face each other across the axis as a pair of pieces.

Moreover, on the small-diameter stepped portion 2c at the top part of the locking pieces 2 there is an anti-rotation plate 8' that engages with the parallel cut faces 3f of the umbrella-shaped stepped end face 3d of the shaft 3 and the pieces 2, and restrains the relative rotation of the shaft 3 and the locking pieces 2.

As shown in FIGS. 3(b) and 3(c), the anti-rotation plate 8' has a center hole 8'd, is formed by a sheet member that is integrally made of a flange 8'b on both sides of which parallel cut faces 8'e are formed, and has a pair of parallel arms 8'a that are bent at a right angle and are continuously formed from the parallel cut faces 8'e of the flange 8'b. The shaft 3 and the parallel cut faces 3d and 2d of the locking pieces 2 are closely held together between a pair of parallel arms 8'a. As shown in FIG. 3(a), the flange 8'b is fit on the small-diameter stepped portion 2c of the locking pieces 2 via the central hole 8'd. This anti-rotation plate 8' allows the locking pieces 2 and the shaft 3 to synchronously rotate under the condition that the relative rotation between the locking pieces 2 and the shaft 3 is restricted, and the axial body 3a of shaft 3 is supported by the axial-body bearing hole 7j of the case 7.

Also, as shown in FIG. 3(a), a pressing spring 5, which is a compression spring, is inserted between the front face of the flange 8'b of the anti-rotation plate 8' that is fit on the small-diameter stepped portion 2c of the locking pieces 2 and the back face of the outer flange 9b of the holding plate 9. The locking pieces 2 are always biased by the pressing spring 5 in the direction pressed by the inclined cam face 3c of the shaft 3. As stated above, the pressing spring 5 always presses the locking pieces 2 toward the inclined cam face 3c of the shaft 3, and it biases the locking pieces 2 in the locking pieces' diameter-enlarged direction. Accordingly, when the locking pieces 2 engage with the locking teeth 2a and 1b of the tubular member 1, the rattling due to backlash is diminished.

In this second embodiment, the locking pieces 2, shaft 3, pressing spring 5, anti-rotation plate 8', and holding plate 9 are accommodated inside the tubular member 1. Also, the shaft 3, locking pieces 2, and tubular member 1 are disposed from the axis towards the outside in that order, and the locking pieces 2 and tubular member 1 are accommodated in an engaged manner in the receiving hole 7c of the case 7. In this way, the axial body 3a of shaft 3 is prevented from falling in such a manner that the axial body is penetrated into the axial-body bearing hole 7j of the projection portion 7g of the case 7, and the C-ring 12 fits on the slot 3g of the rear end of the shaft 3.

In the second embodiment, as stated above, as in the first embodiment—due to a ratchet mechanism—the tubular member 1 can move in such a way that the locking pieces 2 move in its diameter-reduced direction and the locking teeth 2a climb over the locking teeth 1b inside the tubular member 1, and when tubular member 1 moves backward, that movement can be restrained so that a lock mechanism, which is realized by engagement between the locking pieces 2 and the locking teeth 2a and 1b, is provided Also, the locking pieces 2 and shaft 3 are accommodated in the tubular member 1. The shaft 3, locking pieces 2, and tubular member 1 are disposed from the axis to the outside in that order. The locking pieces 2 move in the diameter-reduced direction so as to climb over locking teeth 1b, and therefore the present invention does not need the space toward the outside that is required by the prior-art tensioner (see the 2 Cs in FIGS. 9 and 10). Furthermore, because this embodiment need not have a holder member 330 as is required in the prior-art tensioner, if the outside diameter of case body 7a is set to be identical with the outside diameter d5 of the case body 7a of the prior-art tensioner (see FIG. 8), the diameter of the tubular member 1 can be increased according to the diameter of the prior-art tensioner, and accordingly the diameter of the tubular member 1 can be set so as to allow the locking pieces 2, locking teeth 2a and 1b inside tubular member 1 to be strong enough to endure large loads. Also, the entire tensioner can be structured so as to be slimmer and more compact while ensuring the predetermined strength of the locking teeth 2a and 1b.

Moreover, also in this embodiment, the tubular member 1 that operates as a moving member receives a dynamic load Wc (alternate load) from the belt or chain guide 240. If Wc acts on the closing wall 1a at the top of the tubular member 1, as in the first embodiment, the value of μ varies with time due to variations in the dynamic load. Because the locking pieces 2 have locking teeth (screw teeth) 2a having a lead angle θ2, rotating torque Tn is generated on the locking pieces due to the dynamic load Wc, while braking torque Tn is generated on the inclined cam face 2b due to friction.

Tn and Tm vary during the operation of the tensioner. When Tn exceeds Tm, the locking pieces 2 and the shaft 3, which are restrained by the anti-rotation plate 8' in the rotational direction, make a slight slip rotation between the contact face of the front face of the end wall 7*i* of the projection portion 7*g* of the case 7 and the back face of the umbrella-shaped stepped end face 3*d*. The contact face angle γ at a right angle to the axis that is made when the end wall 7*i* contacts the umbrella-shaped stepped end face 3*d* is γ=0 (deg), which results in smaller braking torque Tm, as expressed by the above Formulas 2 and 2-1, when compared to the conditions that the angle of the inclined cam faces 2*b* and 3*c* of the locking pieces 2 and shaft 3 that become the rotating sliding surface of the locking pieces 2 at a right angle to the axis is γ>0, as in the first embodiment (having the effect of a wedge shape). Accordingly, Tn tends to exceed Tm, which helps the locking pieces 2 and shaft 3 to rotate synchronously.

Due to this synchronous rotation of the locking pieces 2 and shaft 3, the tubular member 1, which engages with the locking teeth 2*a* of locking pieces 2, moves backward in the axial direction, i.e., the tubular member 1 makes return movements because the operation of the tubular member 1 in the rotational direction is restrained by the engagement of the tubular member 1 with the bearing 10 at the top part of the case 2. The rotation angle of the locking pieces 2 has a small range of values, and therefore if the tubular member 1 receives Wc continuously, the tubular member is capable of moving backward gradually.

Also, when designing this embodiment of the tensioner, as in the first embodiment, the dimensions of the parts and the specifications are appropriately set, as described above, so that the value of the Y axis in FIG. 4 that satisfies the aforementioned Formula 3 becomes negative, which is the condition whereby the tubular member 1 is able to make return movements. The prior-art tensioner has drawbacks such that the moving member is not able to make backward return movements, and has to protect against overload by contracting the holder spring 360 at the back of holder member 330 as shown FIG. 8(*a*) and the like. As stated above, the present invention remedies such drawbacks and is able, without needing a holder spring, to protect against overload due to return movements of the moving member.

Embodiment 3

FIG. 6 is a vertical cross-sectional view that shows the third embodiment of the present invention's tensioner.

In contrast to the aforementioned embodiments, in the third embodiment all of the members accommodated in case 7 are disposed in the opposite direction in relation to the axis, and the case 7 is eliminated so that the structure is made simple. The tubular member 1 directly penetrates into the mounting hole 260 of the engine body 200 and is fixed thereto, and the shaft 3 is set as a moving member so that it can advance. Although this embodiment differs from the first embodiment in that the shapes of both ends of the tubular member 1 and the shaft 3 are slightly different from their counterparts in the first embodiment, and the structure by which the tubular member 1 is attached to the engine body 200 is different, the remainder of the structure is basically the same as that of the first embodiment.

In the third embodiment, openings are provided at both ends of the tubular member 1, and locking teeth 1*b* with which a pair of locking pieces 2 engage are fully formed on the inside surface of the tubular member 1. Also, an outside flange 1*e* is provided at the rear end of the tubular member 1. The forward part of the body from the outside flange 1*e* of the tubular member 1 penetrates into the mounting hole 260, together with the propelling spring 4 (explained below) that is fitted on the outside of the body part, and the cap-shaped attaching lid 11 is placed on the outside flange 1*e* while the outside flange 1*e* contacts the attaching surface 250 of the engine body 200.

The bolts that penetrate into the bolt mounting holes (not shown) provided on the flange 11*a* are engaged with the internal thread of the attaching surface 250 of the engine body 200, so that cap-shaped attaching lid 11 is fixed onto the attaching surface 250 of the engine body 200 together with the outside flange 1*e* of the tubular member 1.

In Embodiment 3, at the top part of the shaft 3 is an exterior flange 3*h* that protrudes from the head 1*c*' of the tubular member 1, in which the backward part of the axial body 3*a* from the exterior flange 3*h* penetrates into the tubular member 1 and contacts the belt or chain guide (not shown) and moves back and forth. In this condition, the outside diameter of the axial body 3*a* of the shaft 3 is slightly smaller than the inside diameter of the locking teeth 1*b* of the tubular member 1. If the space in the diameter direction between the inner surface of tubular member 1 and the outside surface of axial body 3*a* of shaft 3 is made smaller, the lateral load strength of the shaft 3 and the tubular member 1 can be increased. Also, if oil pressure is applied inside the tubular member 1, a seal can be accommodated by providing a space for a seal, and if the sealing needs to be increased further, a seal member 12 can be provided between the inner surface of the head 1*c*' of the tubular member 1 and the outside surface of the axial body 3*a* of shaft 3, so that sealing to maintain oil pressure is secured.

On the outside periphery of the rear end of the axial body 3*a* of the shaft 3, there is formed an inclined cam face 3*c* that has a conical surface whose diameter is gradually enlarged in the moving direction, and a small-diameter axial region 3*e* is continuously formed, with the slot 3*i* piercing the outside of the rear end of the small-diameter axial region 3*e*. This inclined cam face 3*c* operates as a locking-piece receiving part that receives multiple separated nut-shaped locking pieces 2 as in the first embodiment.

A propelling spring 4, which is a compression spring, that is fit on the outside of the body of the tubular member 1, is accommodated inside mounting hole 260 of the engine body 200, between the back of the exterior flange 3*h* of the shaft 3 and the front of the outside flange 1*e* of the tubular member 1. This propelling spring 4 biases the shaft 3, so that shaft 3 moves in the axial direction so as to protrude from the tubular member 1.

In this embodiment, as in Embodiments 1 and 2, there is no need for a holder member 330 or holder spring 360 as is required in the prior-art tensioner [FIG. 8(*a*)]. The overload protection function when overload from the engine occurs will be explained later.

In the third embodiment, the locking pieces 2 are used in such a manner that the locking pieces 2 of Embodiments 1 and 2 are reversed in the axial (moving) direction, an inclined cam face 2*b* having a partial conical surface whose diameter is gradually enlarged in the moving direction of shaft 3 is formed on the inner circumference at the top part of the locking pieces 2, and a small-diameter stepped portion 2*c* is formed at the rear end the locking pieces 2. In other regards the structure is the same as those of Embodiments 1 and 2. Also in this embodiment, locking pieces 2, whose number is determined by the amount of load from the engine, are disposed so that they face each other across the axis.

Also in this embodiment, a holding plate 9 is slidably fit onto the small-diameter axial region 3*e* of the shaft 3, and a C-ring 10 that engages with the inside of the groove 3*i* of the small-diameter axial region 3e prevents the holding plate 9 from falling from the rear end of the small-diameter axial region 3e.

Furthermore, a pressing spring 5, which is a compression spring, is disposed between the holding plate 9 and a washer 8 that is on the small-diameter stepped portions 2c of the locking pieces 2. The pressing spring 5 always presses the locking pieces 2 towards the inclined cam face 3c of the shaft 3 and biases the locking pieces in the direction in which the locking pieces are pressed by the pressing spring. Due to this, the pressing spring 5 always presses the locking pieces 2 toward the inclined cam face 3c of the shaft 3, and biases the locking pieces in the locking pieces' diameter-enlarged direction. This secures engagement between the locking pieces 2 and the locking teeth 2a and 1b of the tubular member 1, which decreases the backlash that causes rattling therebetween. Also in this embodiment, a washer 8 that does not restrict the relative rotation of locking pieces 2 is provided as in the first embodiment, and thus the locking pieces 2 can revolve around the inclined cam face 3c of the shaft 3.

In the Embodiment 3, as stated above, due to the ratchet mechanism as in Embodiments 1 and 2, the shaft 3 is able to move in such a way that the locking pieces 2 move in its diameter-reduced direction, and the locking teeth 2a climb over the locking teeth 1b inside the tubular member 1, and when the shaft 3 moves backwards, the backwards movement can be restrained such that a lock mechanism, which is realized by engagement between the locking pieces 2 and the locking teeth 2a and 1b, is provided. Also, the shaft 3 can operate, as in Embodiments 1 and 2, according to an appropriate load when a small engine is operated normally or a light load when an engine is operated while it is cold.

Also in this embodiment, the locking pieces 2 and the shaft 3 are accommodated in the tubular member 1, and the shaft 3, locking pieces 2, and tubular member 1 are disposed from the axis to the outside in that order, and the locking pieces 2 move in the locking pieces' diameter-reduced direction so as to climb over the locking teeth 1b, and therefore the present invention does not need the space that the prior-art tensioner requires towards the outside (see the 2 Cs in FIGS. 9 and 10). Furthermore, because this embodiment does not need the holder member 330 that the prior-art tensioner requires, if the outside diameter of case body 7a is set to be identical with the outside diameter d5 of the case body 7a of the prior-art tensioner (see FIG. 8), the diameter of the tubular member 1 can be increased according to the diameter of the prior-art tensioner, and accordingly that diameter can be set so as to allow the locking pieces 2 and the locking teeth 2a and 1b inside the tubular member 1 to be strong enough to endure large loads. Also, the entire tensioner can be slimmer and more compact while ensuring the necessary strength of the locking teeth 2a and 1b.

In addition, because the third embodiment eliminates the case 7 that is in Embodiments 1 and 2, the tensioner's structure can be simpler, so that the tensioner can be smaller, lighter, and produced at less cost.

Furthermore, in this embodiment, as in the first embodiment, if during engine operation a dynamic load Wc (alternate load) from the belt or chain guide 240 acts on the exterior flange 3h of the top part of the shaft 3 (which is a moving member) and which action is caused because the locking pieces 2 that receive the backward shaft load Wc via the inclined cam face 3c of the shaft 3 have locking teeth (screw teeth) 2a that have a lead angle θ2, then rotating torque Tn due to Wc is generated on the locking pieces 2, while braking torque Tm due to friction is generated on the inclined cam face 2b.

Tn and Tm change repeatedly. When Tn exceeds Tm, the locking pieces 2 make a slight slip rotation on the inclined cam face 3c of the shaft 3.

The rotation of the locking pieces 2 that results from the engagement of the locking teeth 2a with the locking teeth 1b inside the tubular member 1 causes the locking pieces 2 to move backward in the axial direction. With the backward movement of these locking pieces 2, the shaft 3, which receives shaft load Wc backwards, starts to make return movements. Because the rotation angle of the locking pieces 2 has a very small range of values, if the shaft 3 receives Wc continuously, the shaft is able to move backward gradually.

Also in this embodiment, as in the first embodiment, when designing the present invention's tensioner, the dimensions of the parts and the specifications are appropriately set, as describd aobve, so that the value that satisfies the aforementioned Formula 3 of the Y axis in FIG. 4 becomes negative, which is the condition where the shaft 3 is capable of making return movements. The prior-art tensioner has drawbacks such that the moving member is not able to make return movements backwards, and has to prevent overload by contracting the holder spring 360 that is accommodated at the back of the holder member 330, as shown by FIG. 8(a) and the like. As stated above, the present invention remedies such drawbacks and is able, without needing a holder spring, to prevent overload caused by return movements of the shaft 3.

The present invention's tensioner can freely utilize a variety of combinations of structural members, so as to realize embodiments other than those shown in FIGS. 1 through 6. The shapes, combinations, or structures of such members as the tubular member 1, locking pieces 2, shaft 3, propelling spring 4, pressing spring 5, and case 7 can be changed as desired so as to increase the strength of the locking teeth, to decrease the backlash, to reduce the number of parts and the cost of production, and to maximize design freedom.

Also, the shapes diameters, or other dimensions of the compression spring, such as the propelling spring 4 and the pressing spring 5, can be changed as desired, so that the compressive force of the spring can be adjusted as desired. Moreover, a coil spring, disc spring, rubber body, resin body, or the like can optionally be applied for the compression spring.

EXPLANATIONS OF THE REFERENCE CHARACTERS

Figure 1A:
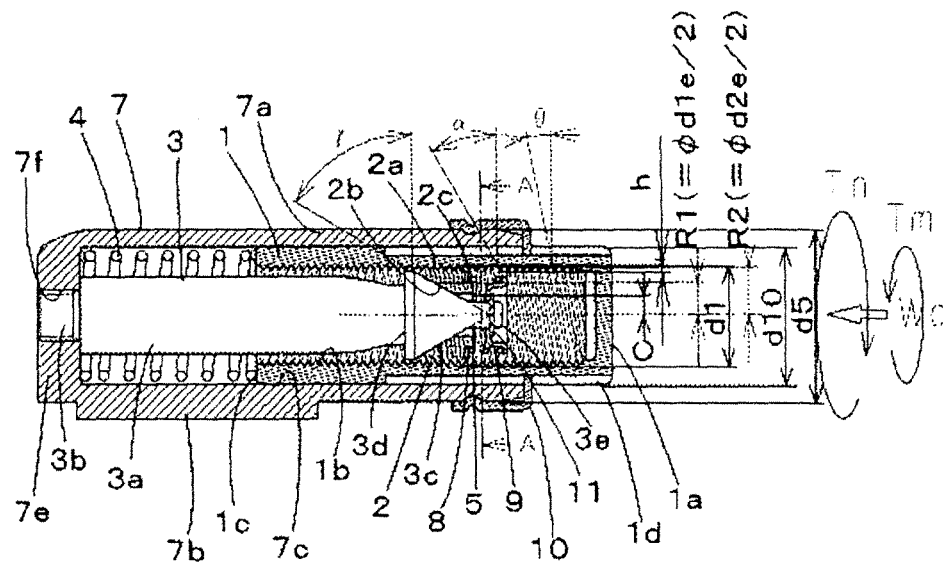
FIG. 1(a) is a vertical cross-sectional view that shows the first embodiment of the tensioner of the present invention.
Figure 1B:
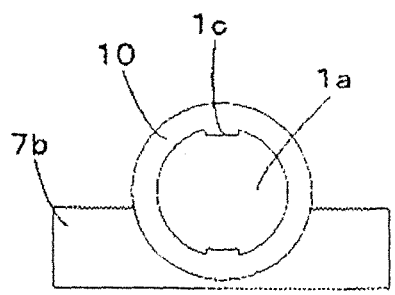
FIG. 1(b) is a right-side view of FIG. 1(a)
Figure 1C:
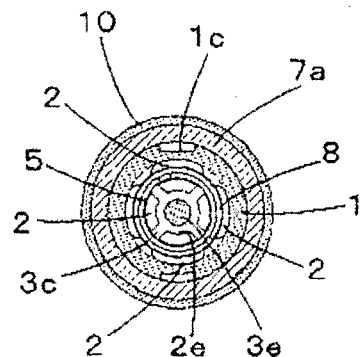
FIG. 1(c) is a cross-sectional view along line A-A of FIG. 1(a).
Figure 2:
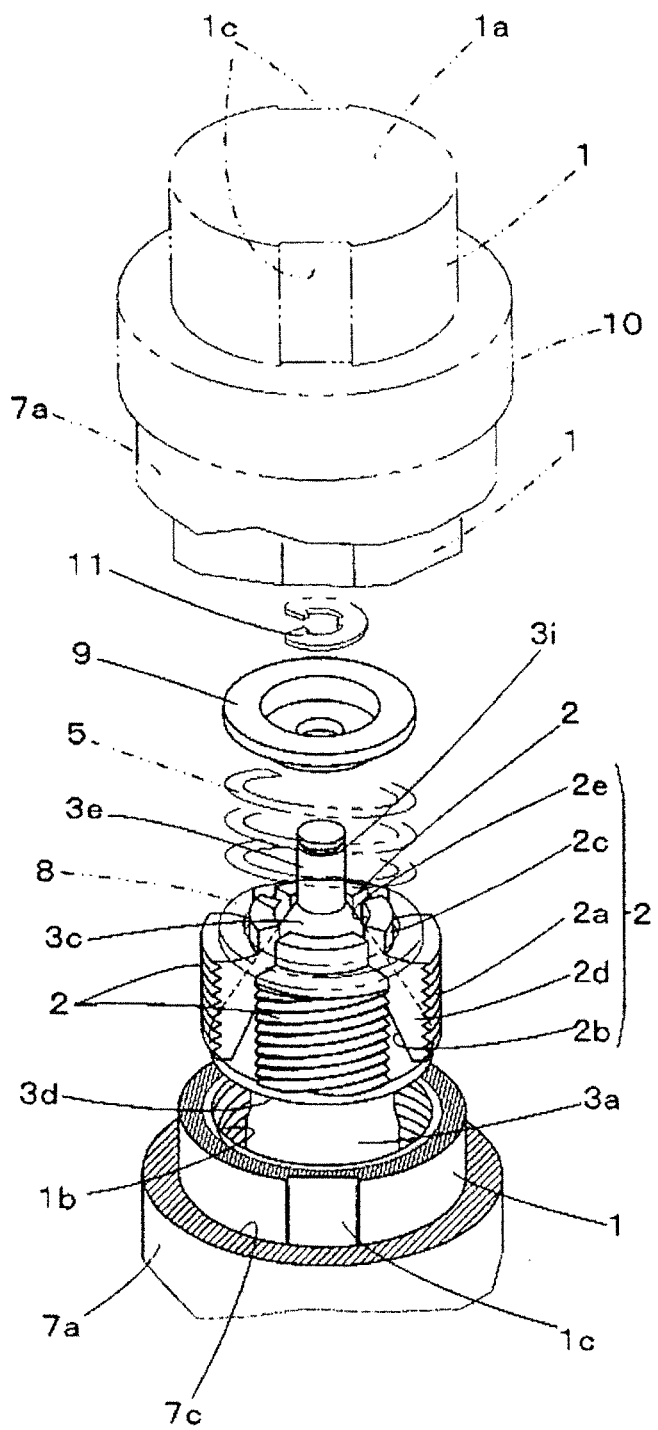
FIG. 2 is an exploded perspective view of a principal part of the top part (ratchet mechanism).
Figure 3A:
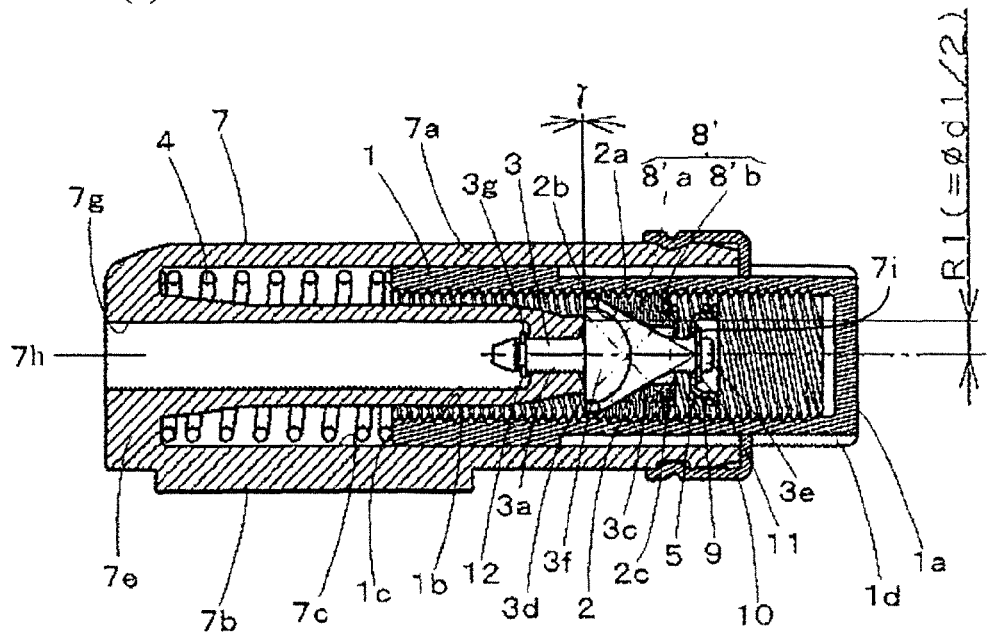
FIG. 3(a) is a vertical cross-sectional view that shows the second embodiment of the tensioner of the present invention.
Figure 3B:
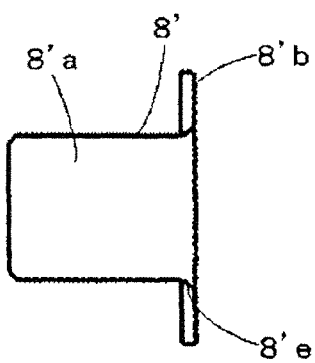
FIGS. 3(b) and 3(c) are, respectively, a side view and view seen from the left side of the anti-rotation plate of the second embodiment.
Figure 3C:
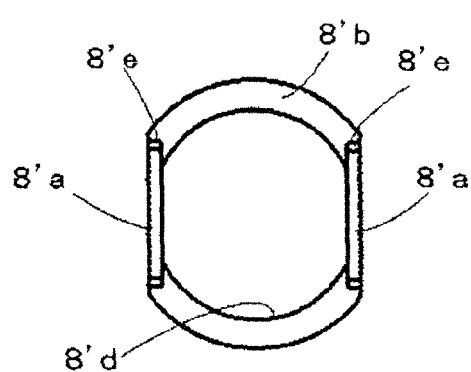
Figure 4:
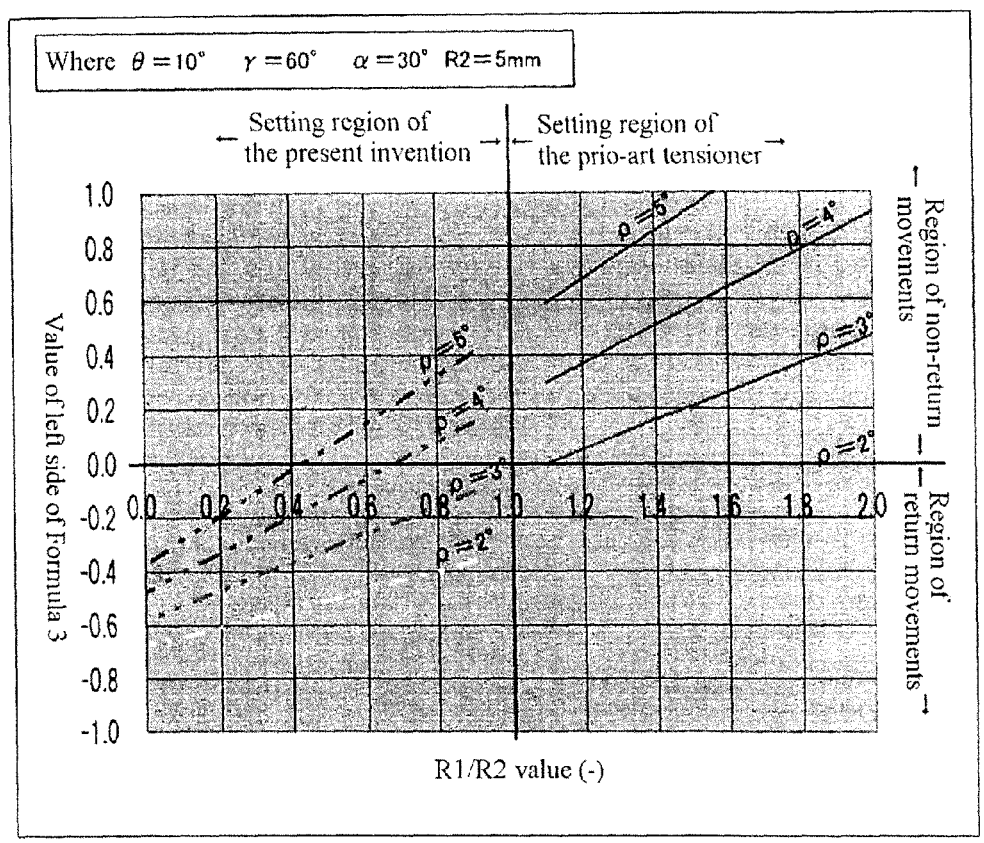
FIG. 4 compares the setting example 1 of the return-movements regions of the present invention's tensioner and the prior-art tensioner.
Figure 5:
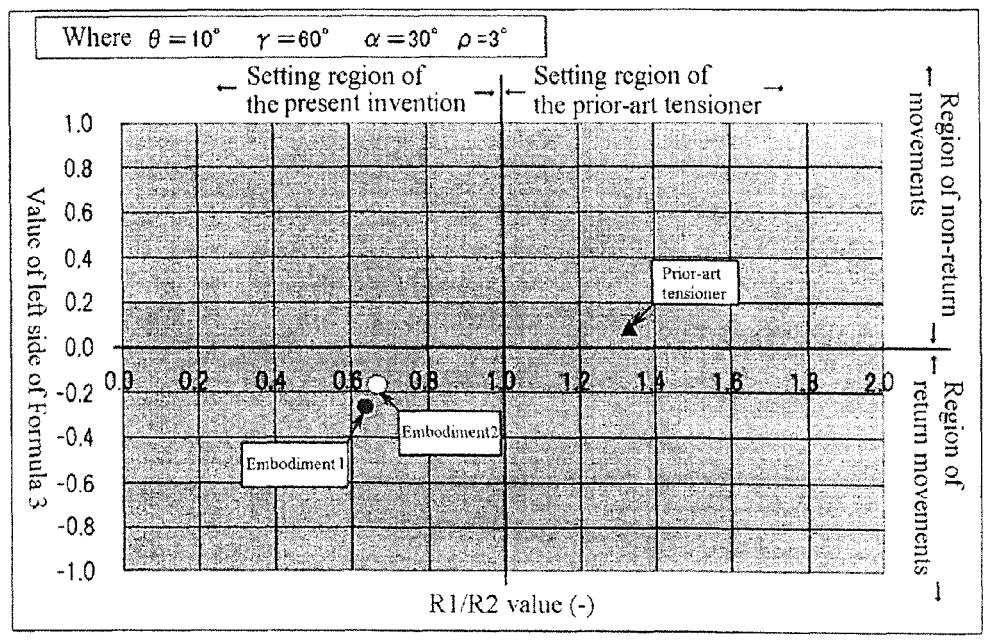
FIG. 5 compares the setting example 2 of the return-movements regions of the present invention's tensioner and the prior-art tensioner.
Figure 6:
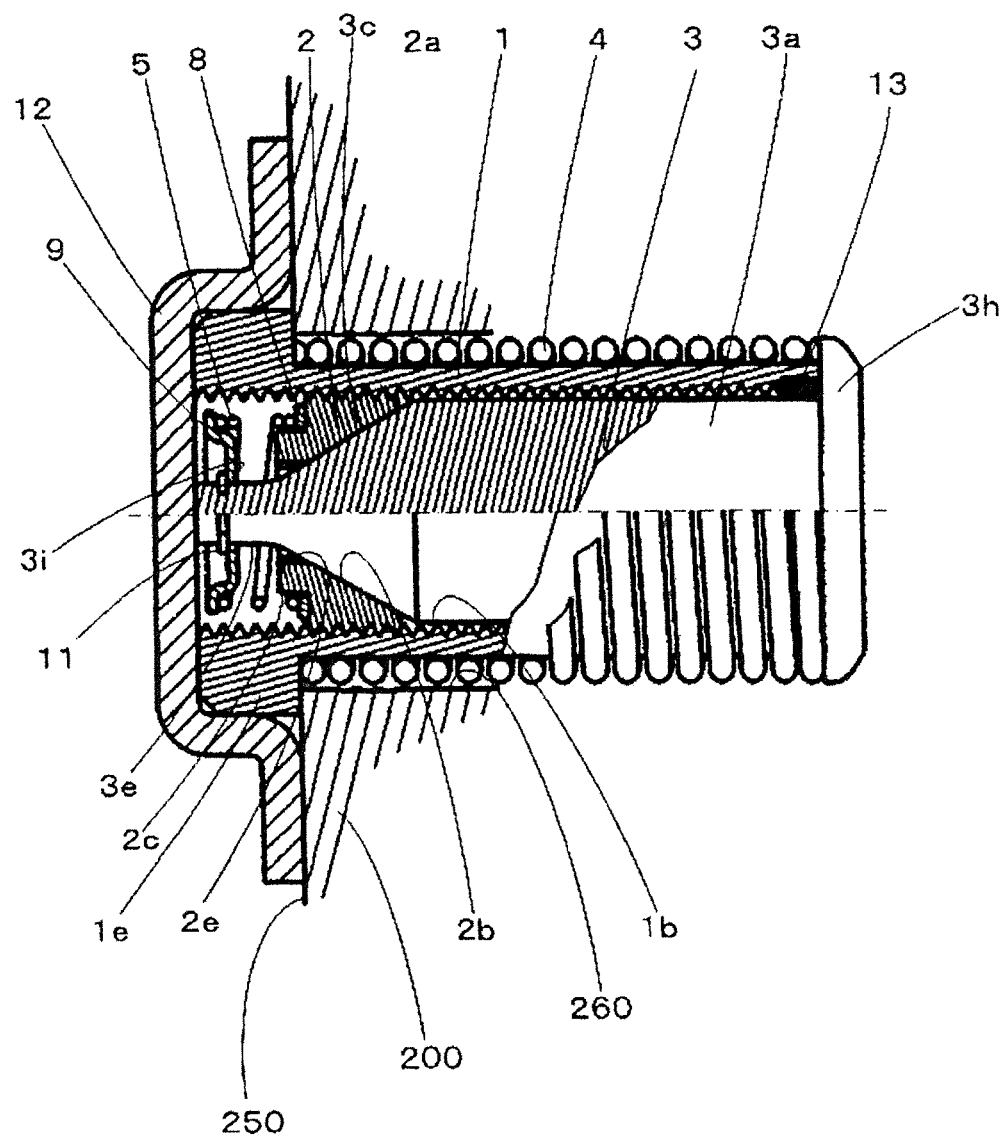
FIG. 6 is a vertical cross-sectional view that shows the third embodiment of the present invention's tensioner.
Figure 7:
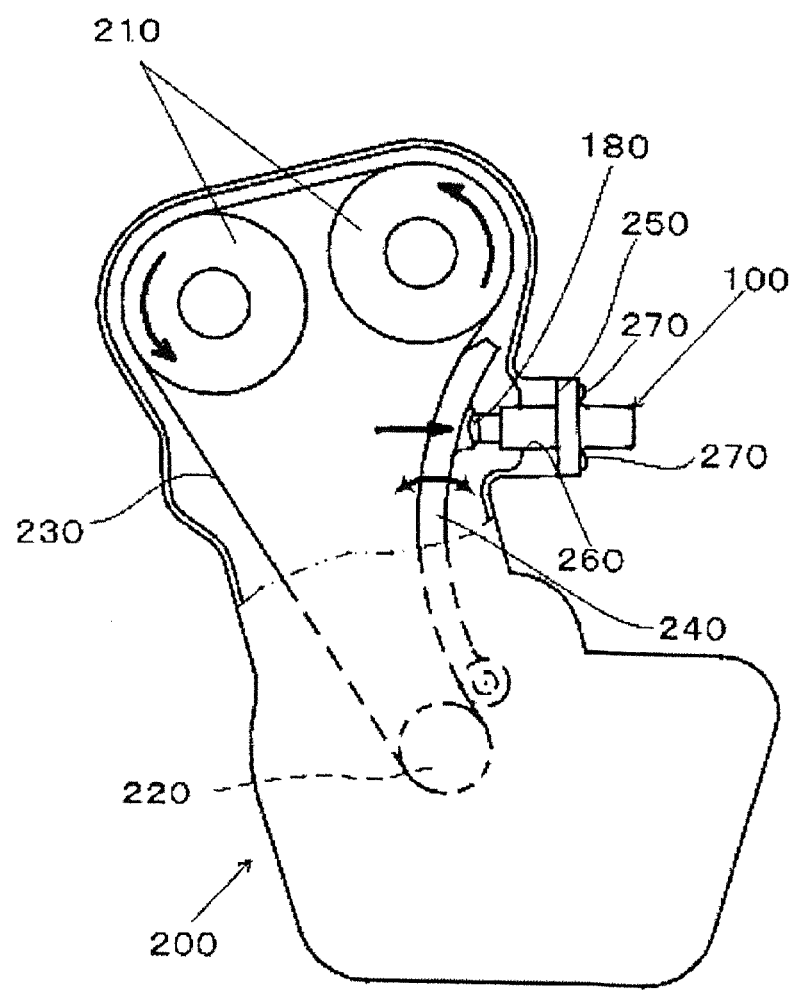
FIG. 7 is a layout drawing that shows a tensioner mounted on an engine body.
Figure 8A:
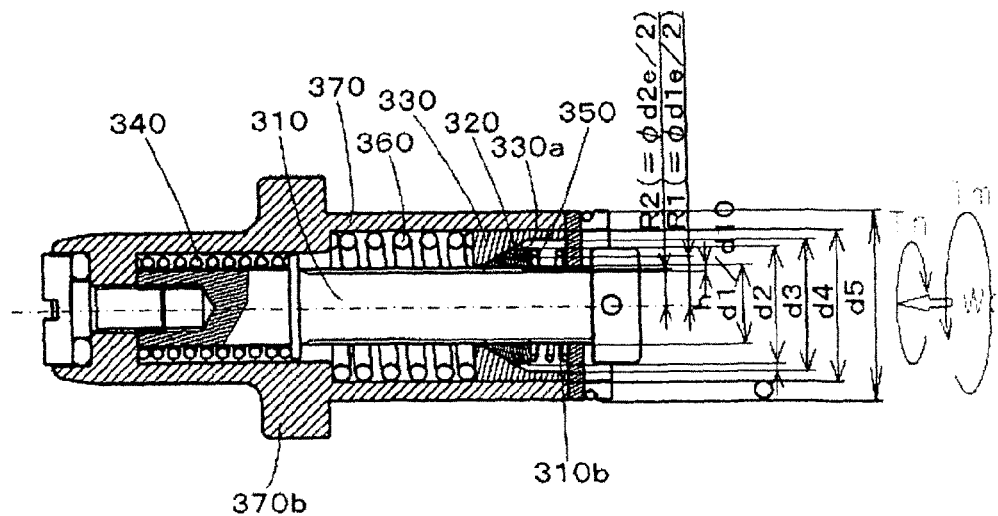
FIG. 8(*a*) is a vertical cross-sectional view that shows one example of a prior-art tensioner, and FIG. 8(*b*) is a right-side view of the tensioner in FIG. 8(*a*).
Figure 8B:
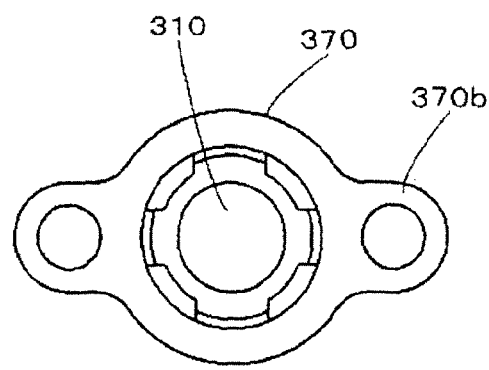
Figure 9A:
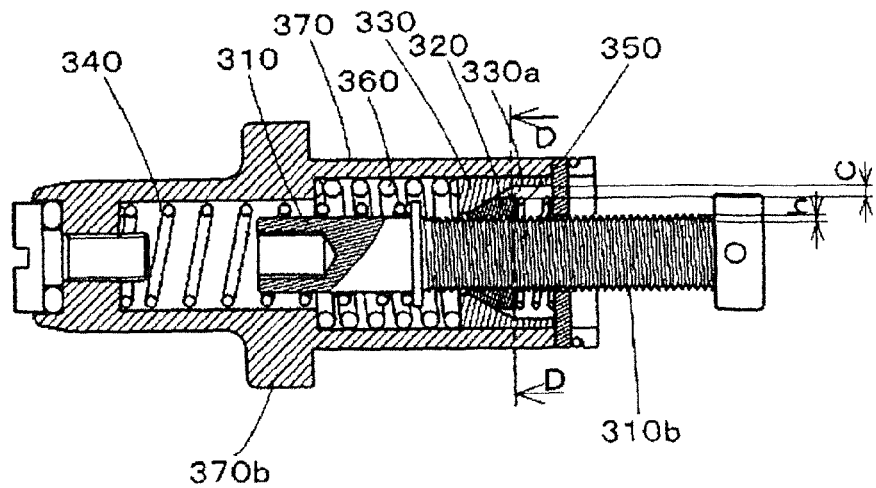
FIG. 9(*a*) shows how the moving member of the tensioner in FIG. 8 completely engages with the locking pieces, and FIG. 9(*b*) is a cross-sectional view along line D-D of FIG. 9(*a*).
Figure 9B:
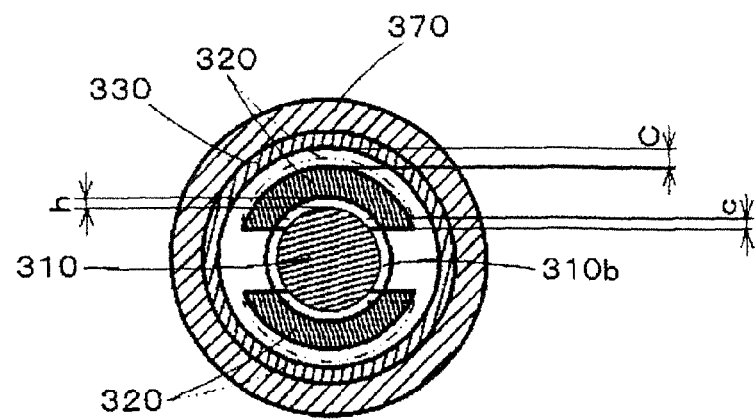
Figure 10A:
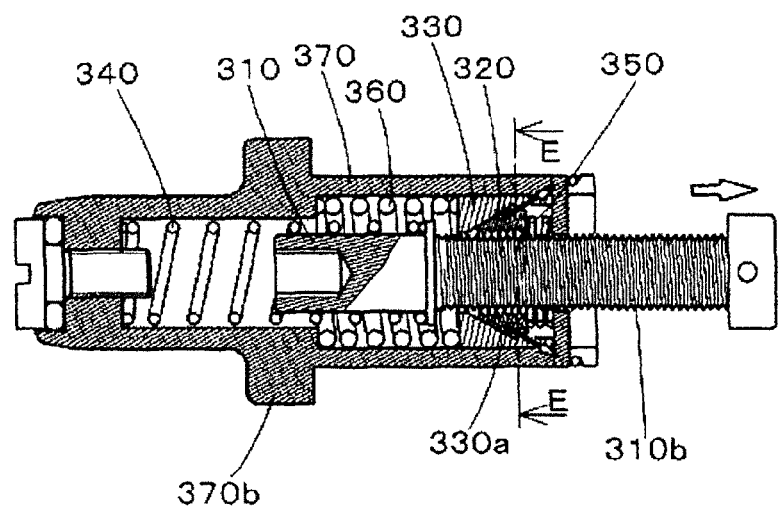
FIG. 10(*a*) shows how the locking pieces are enlarged when the moving member advances in FIG. 9, and FIG. 10(*b*) is a cross-sectional view along line E-E of FIG. 10 (*a*).
Figure 10B:
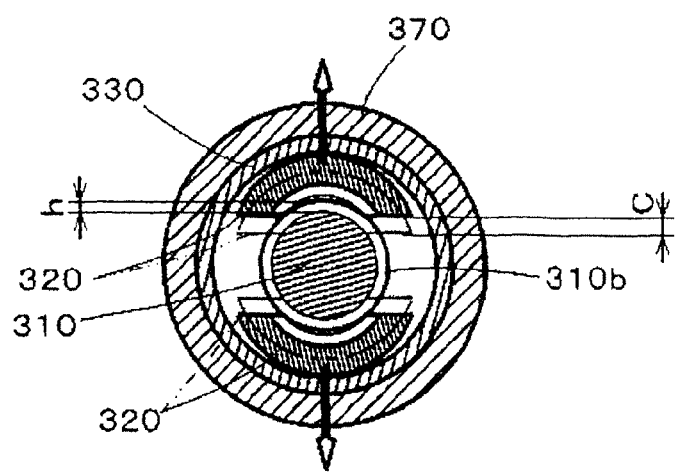

1 tubular member
1*b*, 2*a* locking teeth (screw teeth)
2 locking piece
2*b* inclined cam face
3 shaft
3*c* inclined cam face (locking-piece receiving part)
4 propelling spring
5 pressing spring
7 case
8 washer
8' anti-rotation plate
9 holding plate
10 bearing
200 engine body
250 locating plane
260 mounting hole
d1e effective contact diameter of locking-piece receiving part
d2e effective diameter of contact of locking teeth of locking pieces
R1 effective contact radius of locking-piece receiving part (=d1e/2)
R2 effective contact radius of locking teeth (=d2e/2)
Tm braking torque generated on effective contact radius R1 of locking-piece receiver
Tn rotating torque generated on effective contact radius R2 of locking teeth
We (dynamic) load from an engine
$\rho 1$ friction angle ($=\tan^{-1} \mu 1$)
$\rho 2$ friction angle ($=\tan^{-1} \mu 2$)
$\mu 1$ apparent coefficient of friction of locking pieces and locking-piece receiving part
$\mu 2$ apparent coefficient of friction of locking teeth of tubular member and locking pieces
$\gamma$ contact angle between the plane at a right angle to the axis and the surface in the axial direction by which the locking-piece receiving part or the shaft is supported in the axial direction

The invention claimed is:

1. A tensioner comprising:
a tubular member on which multiple locking teeth are formed, and
one or more locking pieces on which are formed locking teeth that engage with said tubular member's locking teeth;
a shaft disposed inside said tubular member and having a locking-piece receiving part that receives said locking pieces,
wherein either said tubular member or said shaft moves, as a moving member, reciprocally in relation to each other due to a biasing force generated by a biasing member;
a ratchet mechanism is provided in which said locking pieces move in a direction in which a diameter of said locking pieces is reduced so as to climb over the locking teeth of said tubular member so that said moving member can move forward, and said locking pieces move in a direction in which the diameter of the locking pieces is enlarged so as to engage with the locking teeth of said tubular member so that said moving member is restrained from moving backward
said ratchet mechanism includes an inclined cam face, as the locking-piece receiving part, formed so as to enlarge the diameter of said locking in pieces in a direction in which said locking pieces engage with the locking teeth of said tubular member, and a pressing spring that presses said locking pieces towards said inclined cam face of said shaft and biases said locking pieces in the direction in which the diameter of said locking pieces is enlarged; and
said locking teeth of said tubular member are screw teeth, each of which has a lead angle $\theta$, and dimensions of parts are set so as to satisfy the relationship of Formula 3:

$$R1 \cdot \tan \rho 1 + R2 \cdot \tan(\rho 2 - \theta) < 0 \quad \text{Formula 3}$$

where R1=d1e/2, d1e=effective contact diameter of the locking-piece receiving part, R2=d2e/2, d2e=the effective diameter in contact of locking teeth of locking pieces, $\rho 1 = \tan^{-1} \mu 1$ (friction angle), $\mu 1$=apparent coefficient of friction of locking pieces and locking-piece receiving part, $\rho 2 = \tan^{-1} \mu 2$ (friction angle), $\mu 2$=apparent coefficient of friction of the locking teeth of the tubular member and the locking pieces.

2. The tensioner according to claim 1, wherein a rotational movement of one of said tubular member or said shaft is restrained, and said locking pieces are engaged with said tubular member in a relatively rotatable manner.

3. The tensioner according to claim 1, wherein said tubular member is restrained so as to operate in a rotational direction, and said locking pieces and said shaft are engaged so as to be synchronously rotatable.

4. The tensioner according to claim 1, wherein a contact angle $\gamma$ between a plane at a right angle to an axis and a supporting surface by which said locking-piece receiving part or said shaft is supported in an axial direction is set as $\gamma \approx 0°$.

* * * * *